US006601278B2

(12) United States Patent
Koppe

(10) Patent No.: US 6,601,278 B2
(45) Date of Patent: Aug. 5, 2003

(54) PULLER TOOL

(76) Inventor: Rudolf Koppe, 1251 Britannia Rd., Campbellville, Ontario (CA), L0P 1B0

( * ) Notice: Subject to any disclaimer, the term of this patent is extended or adjusted under 35 U.S.C. 154(b) by 0 days.

(21) Appl. No.: 09/951,003

(22) Filed: Sep. 14, 2001

(65) Prior Publication Data

US 2003/0051325 A1 Mar. 20, 2003

(51) Int. Cl.$^{7}$ .................................................. B23P 19/04

(52) U.S. Cl. ............................. 29/259; 29/256; 29/264; 29/278

(58) Field of Search .......................... 81/412, 405, 413, 81/407, 360, 319, 439; 29/256, 264, 259, 278, 244, 261

(56) References Cited

U.S. PATENT DOCUMENTS 1,260,369 A * 3/1918 Goddard ...................... 29/259
3,664,214 A * 5/1972 Feldman ...................... 81/355
4,651,598 A * 3/1987 Warheit ........................ 81/407
5,341,553 A * 8/1994 Herzhauser .................. 29/261
5,983,474 A * 11/1999 Koppe ......................... 29/261

* cited by examiner

*Primary Examiner*—Joseph J. Hail, III
*Assistant Examiner*—Daniel Shanley

(57) ABSTRACT

This invention relates to an improved impeller puller where a first jaw is arranged proximate a first end of an elongate support frame and a second jaw, is movably mounted along the support frame spaced from the first jaw, with both jaws extending radially outwardly from the support frame in general alignment with each other, and an extraction screw member is slidably mounted along the support member so as to be variably extended in general radial alignment with the first and second jaw members, the extraction screw member being arranged to engage a shaft so as to extract the impeller from its mounting shaft.

18 Claims, 5 Drawing Sheets

PULLER TOOL

This invention relates to an improved puller for the removal of parts which may be jam fitted to shafts, housings and the like. In a preferred embodiment the improved puller is particularly suitable for the removal of flexible impellers from a shaft of a water pump.

BACKGROUND OF THE INVENTION

Many mechanical assemblies generally comprise a housing wherein a shaft has a jam or otherwise closely fitted race, bearing, impeller or the like which is mounted to rotate with the shaft. Typically the removal of such components from the shaft for repair or replacement is problematic and requires use of a puller or the like tool.

Many mechanical assemblies comprise centrifugal pumps which generally comprise an impeller closely fitted on a shaft, the impeller being inserted within a housing, the arrangement being designed to pump liquids. For example, liquid cooled internal combustion engines are commonly designed to incorporate water pumps as an integral part of the engine and/or drive train. In marine engine embodiments, the water pump generally comprises a flexible impeller of varying size, dimensions and number of blades. The impeller generally comprises a plurality of resilient, generally elastomeric, curved arms/blades arranged spaced as spokes bonded around a metal hub, the hub having a central opening for mounting to a shaft which rotates the impeller.

It is not unusual for such impellers to be removed for replacement and/or repair, with removal being generally time consuming because of the close tolerance positioning of the water pump on the motor, the close positioning of the motor in the vehicle and/or boat, the jam fit by which the hub of the impeller is typically mounted to a water pump shaft and/or the effects of corrosion, dirt and the like among the shaft and the impeller. It is not unusual for a technician to be forced to use a pair of flat screw drivers to slowly pry the impeller from the shaft, creating the danger of damage to the housing and in many instances so damaging the impeller and/or housing as to make it non-repairable, non-rebuildable or even non-reusable once removed.

Various pullers have been proposed for use in removal of components from their supporting shaft but each have limitations in use. U.S. Pat. No. 5,341,553 discloses puller particularly suitable for pulling impellers from water pumps of marine engines, which purports to solve the problem of flexible impeller removal from water pump shafts, but has been found problematic in that it is easily misaligned and can cause damage to the impeller and even further jam the impeller on the shaft and make the removal process more difficult and even technically elusive to a technician.

U.S. Pat. No. 5,983,474 discloses an improved puller to that disclosed in U.S. Pat. No. 5,341,553, the improved puller having a wider breadth of efficient uses including being more efficient in removing an impeller by automatically aligning and significantly reducing damage to the impeller during removal. Unfortunately, the device is expensive to manufacture and thus has limited buyer appeal to those primarily seeking a low cost impeller removal device.

It is an object of the present invention to provide an improved puller which will facilitate the removal of components from shafts, particularly impellers.

It is another object of the invention to provide a universal impeller puller which is easily aligned and convenient to operate for the effective removal of a flexible impeller from a pump housing.

It is a still further object of the invention to provide a universal impeller puller which is cost effective to manufacture.

These and other objects of the invention will become apparent in the following recitation of the invention.

SUMMARY OF THE INVENTION

The present invention comprises an improved adjustable puller which has particular application for uses disclosed in U.S. Pat. No. 5,341,553 in the removal of flexible impellers of spaced blade design having varying dimension and number of blades.

The improved adjustable puller generally comprises an elongate support member having a first and opposite end. The support member comprises spaced apart first and second gripping jaw members, arranged to extend radially outwardly, in generally alignment to each other, from the support member to engage a hub of an impeller, and an elongate, twist threaded extraction screw member, which is arranged to be incrementally screwed radially outwardly from the support member in general alignment with said jaw members to engage a hub mounting shaft and force extraction of the hub, and thus the impeller, from the shaft.

In the arrangement of the invention, the first jaw member is arranged proximate the first end of the elongate support member, the second jaw member is slidably mounted along the support member arranged for variably spaced movement thereof toward and away from the first jaw member, and the elongate extraction screw member is mounted to the support member between the jaw members or between the first jaw member and about the first end of the support member.

In one embodiment, the first jaw member is arranged spaced proximate to the first end of the support member, and the elongate extraction screw member is mounted along the support member between the first jaw member and at or about the first end of the support member. In a preferred embodiment the extraction screw member is slidably mounted between the first jaw member and the first end.

In another embodiment, the first jaw member is arranged near proximate the first end of the support member, and the elongate extraction screw member is slidably mounted along the support member between the first jaw member and the second jaw member.

In a pivot plier embodiment, the support member comprises first and second elongate members, the first jaw member is integral to the first elongate member, being either directly cast or otherwise fixed thereto with the elongate length of the first elongate member extending about perpendicular from the first jaw member as an elongate handle. The first elongate member comprises a plurality of about equal diameter holes which overlap at their circumference so as to create an opening therebetween. The holes are spaced from the first jaw member and are aligned along the support member in spaced gradient therefrom. The second jaw member is integral or otherwise fixed to a second elongate member. The second elongate member comprises a stud extending in a plane about perpendicular to the second jaw member and spaced therefrom. The stud is sized to extend from the second member and couple with the overlapping holes of the first member. Slidable movement of the stud through the openings formed by the overlapping arrangement, enables movement of the stud from hole to hole. The arrangement enables slidably moving the stud and thus the second jaw member from hole to overlapping hole along the support member without removal of the stud from the plurality of holes. Such coupled arrangement of gripping jaws and handles is generally referred to as a pivot plier type arrangement.

In operation of the pivot plier embodiment, the second jaw member is moved from hole to hole as desired to position the second jaw member along the support member in a desired spaced relationship to the first jaw member. The extended length of the elongate members comprise handles, arranged to be generally offset angled from each other at all spaced hole positions and hand compressing the handles toward each other causes the second jaw member to pivot at the coupled position of stud and hole, and grip the hub of the impeller between the jaws. In one arrangement of this embodiment, the holes are sized and arranged to provide spacing between the jaws, when in a generally parallel opposing position, which corresponds to standard diameters of hubs of standard impellers. In a particularly preferred embodiment, the first jaw is angled from perpendicular toward the second jaw to provide first gripping pressure by the jaw on the interior end of the hub.

In such pivot plier embodiment the elongate extraction screw member can be arranged slidable between the jaw members or between the first jaw member and the first end of the support member. Thus, in an arrangement wherein the elongate extraction screw member is slidably mounted to the support member between the first jaw member and the second jaw member, the opposing jaws of the device are aligned on the exterior surface of the hub and the handles pressed together to secure the device to the hub. The elongate extraction screw member is moved to a position adjacent the end of the shaft mounting the hub and is twist screwed to directly engage the shaft and disengage the hub from the shaft, with the handles extending outwardly generally perpendicular to the centerline of the shaft to be used as a lever so that the hub can be coincidentally rocked from side to side for assisting extraction of the impeller.

In a pivot plier arrangement wherein the elongate extraction screw member is mounted to the support member between the first jaw member and the first end of the support member, the opposing jaws of the device are aligned on the exterior surface at opposite points on the hub and the handles pressed toward each other to secure the device to the hub as described aforesaid, and the elongate extraction screw member is positioned to engage the housing, with the outwardly extending handles used to leverage a prying extraction action to pull the impeller from the shaft.

Generally, such pivot plier arrangement relies upon the user maintaining a significant force upon both handles to retain the grip of the jaws upon the hub of the impeller. In a preferred embodiment, means are provided whereupon the handles can be retained at a desired force by a locking loop, latch and the like which enables the user to release the handles while pivot plier retains the desired grip on the hub.

In a twist screw urged embodiment of the invention, a jaw member, slidably mounted along the elongate support member, is arranged to be twist screw urged toward the other jaw member as distinct from manual pivot levered urging of offset handles. As with the pivot plier embodiment, it is preferred that a first jaw member be fixed proximate the first end of the support member and generally about perpendicular thereto. The second jaw member is slidably mounted along the support member and a twist screw urging means is arranged generally along a longitudinal axis of the support member so as to engage the second jaw member and urge it toward the first jaw member.

In one twist screw urged embodiment, the support member comprises an elongate slotted hollow tube in which an integral base end of the jaw member is slidably retained and the twist screw urging member is arranged so than an end thereof engages the base end of the jaw member for urging same toward the other jaw member. Generally, any convenient tube can be adopted for this embodiment, but preferably a polygonal walled tube and most preferably four walled box tube construction is preferred.

In a particularly convenient twist screw urged assembly of the invention, the support member is a constructed four wall box tube formed by connecting two elongate generally "U" shaped channel members, spaced apart with legs facing, in generally parallel facing opposition. The jaw members comprise an enlarged base which has extending therefrom a narrowed elongate toothed jaw. The base end of the jaw member is generally polygonal configured and is sized to fit between the legs of the facing channels, with the elongate toothed end being sufficiently narrow to extend through the opening between the spaced apart channel members. The base end of the first jaw member is sized and configured to be a spacer block, to which the facing channel members can be connected to retain their spaced relationship at a first end of the support member. A similarly dimensioned polygonal configured spacer urging block is arranged to connect the facing channel members in spaced relationship at about the opposite end of the support member. The spacer urging block comprises a threaded hole therethrough along about a central axis of the constructed support member for threaded insertion of a mating twist threaded urging screw member. Thus, the channel members are connected to the spacer blocks to form a four walled elongate tube support member having a generally polygonal interior hollow between the spacer blocks and containing aligned elongate slotted openings through opposite surfaces of the support member surrounding the hollow.

The polygonal configured base end of the second jaw member is dimensioned slightly smaller than the polygonal configured spacer urging block and base end of the first jaw member and is arranged within the hollow, with the narrowed elongate toothed jaw extending through the slot in general alignment with the elongate toothed jaw end of the first jaw member. The slightly smaller dimensioning of the base end of the second jaw member enables it to be slidably moved longitudinally within the hollow of the support member.

Arranged within the hollow between the first and second jaw member, is an extraction screw means comprising a polygonal extraction block having a threaded hole therethrough, this hole being arranged in the hollow about perpendicular to a longitudinal axis of the support member. As with the second jaw member, the extraction block is sized and dimensioned slightly smaller than the polygonal configured spacer urging block and base end of the first jaw member so as to slidably move longitudinally within the hollow of the support member. The threaded hole in the extraction block is dimensioned such that a mating twist threaded extraction screw member can be threaded through the block without interference with the sides of the aligned elongate slotted openings formed by the channel members comprising the support member.

This assembly is not only particularly convenient to assemble, but enables a locking grip to be maintained by the jaws on the hub and by providing an appropriate configured surface on the urging screw member, enables the use of a wrench or other leveraged tool for urging the jaws against the hub. As with the pivot plier arrangement, the opposite end of the elongate support member may be used for leverage rocking of the hub off the shaft, and an extraction screw member may even be positioned proximate the first end of the support member to enable leveraged prying of the hub off the shaft.

The gripping jaw members generally comprise an elongate structure, having one or more gripping elements arranged along the surface thereof which faces the hub of the impeller. In a preferred embodiment, gripping elements are arranged along its length as teeth extending from the surface.

A typical impeller for pumping water in motorized water craft, comprises a plurality of elastomer arms integrally bonded to a metallic hub. The impeller sits within a closely confining space, the hub generally sized to have a close axial clearance from the front and back of the housing. Generally the clearance is so close within the interior space of the housing, that teeth of the gripping jaws cannot be arranged to engage the rear edge of the hub, and in order for the puller to gain a suitable grip, the teeth must engage the elastomer bonding on the hub. Thus, the gripping elements of the gripping jaws engage the elastomer bonded to the hub, the extraction screw member engages the shaft and as the support member is forced axially outwardly from the shaft, the gripping jaws pull the hub axially along with it.

In a preferred embodiment, the end of the jaw members are angled toward each other so that the force generated by the extraction screw member is concentrated at the interior end of the hub significantly reducing the likelihood of tearing the elastomeric covering from the hub during the extraction process.

For a fuller understanding of the nature of the present invention, reference is made to the following detailed description taken in connection with the drawings.

DETAILED DESCRIPTION OF THE INVENTION

Figure 1:
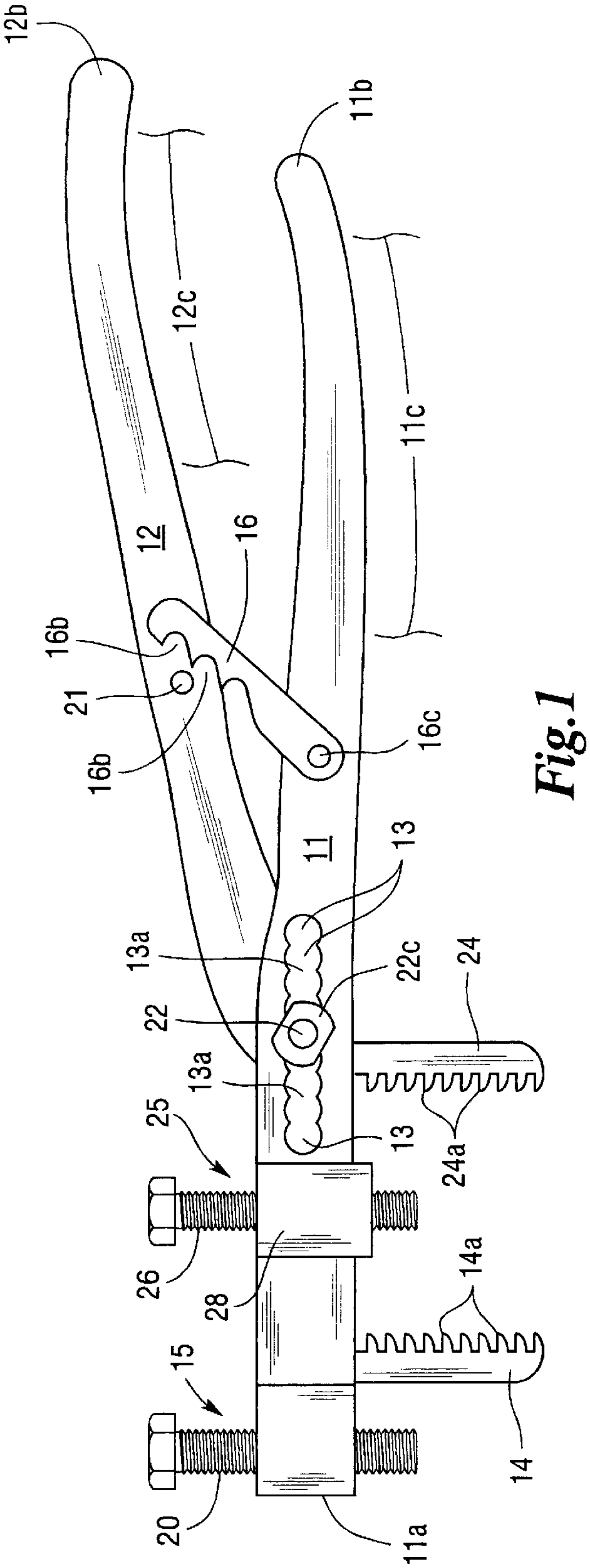
FIG. 1 is a side view of a pivot plier impeller puller embodiment of the invention.

Referring now to the FIGS. 1–3A, therein is illustrated a pivot plier impeller puller of the invention, wherein the support member comprises first and second elongate pivot members 11 and 12 respectively.

Elongate member 11 is depicted as comprising first end 11*a*, opposite end 11*b*, handle portion 11*c*, a plurality of about equal diameter aligned holes 13, which overlap at their circumference so as to create openings 13*a* therebetween, first gripping jaw 14, end extraction means 15 and latch member 16 which is pivotally attached along member 11 by rivet stud 16*c*. First gripping jaw 14 is illustrated integrally cast proximate first end 11*a* of elongate member 11, arranged to extend about perpendicular therefrom and having a plurality of teeth 14*a* arranged along the length thereof. Handle portion 11*c* of elongate member 11, is illustrated in this particular embodiment as being slightly curved to enable easier gripping by a user, and containing latch member 16, which is illustrated as comprising rounded slots 16*b* along a side thereof arranged to lockingly engage a stud extending from elongate member 12 and a hole (not shown) at end 16*a*, through which rivet stud 16*c* extends for riveted pivot attachment of latch member 16 to the elongate member. End extraction means 15 is depicted as integral to elongate member 11, comprising a threaded hole 15*a* at first end 11*a* of elongate member 11, and mating threaded elongate extraction bolt 20, arranged to be twist screwed a variable length about perpendicular to the centerline of elongate member 11. Center shaft extraction means 25 is illustrated as alternate means comprising extraction block 28 containing threaded hole 27 to matingly engage extraction bolt 26 and mounting slot 29 for alternate slidable mounting and easy removal from elongate member 11.

Second elongate member 12, is illustrated as comprising first end 12*a*, opposite end 12*b*, handle portion 12*c*, latch stud 21, attachment stud 22 and second gripping jaw 24. Second gripping jaw 24 is illustrated as integrally cast at about first end 12*a* of elongate member 12, arranged to extend angularly from about the centerline of the second member and having a plurality of teeth 24*a* arranged along the length thereof. Handle portion 12*c* of elongate member 12, is also illustrated as being slightly curved to enable easier gripping by a user, with latch stud 21 being arranged to extend about perpendicular to elongate member 12 and sized to enable locking engagement of rounded slots 16*b* of latch member 16. Attachment stud 22 is sized in diameter to enable slidable passage thereof through openings 13*a* between holes 13 of elongate member 11, and sized in length to extend through said holes and openings for coupled engagement of elongate member 11 to elongate member 12. In the illustrated embodiment, elongate member 12 comprises a hole through which stud 22 is jam forced. Stud 22 is further illustrated as comprising a rounded end 22*a* and a threaded end 22*b*. The rounded end being jammed against elongate member 12, the threaded arranged for mounting of threaded nut 22*c* to enable adjustable tightening of elongate member 11 to elongate member 12. It should be understood that any suitable means such as bolt means rivet means and the like is contemplated within the present invention to couple the first and second elongate members.

Figure 2:
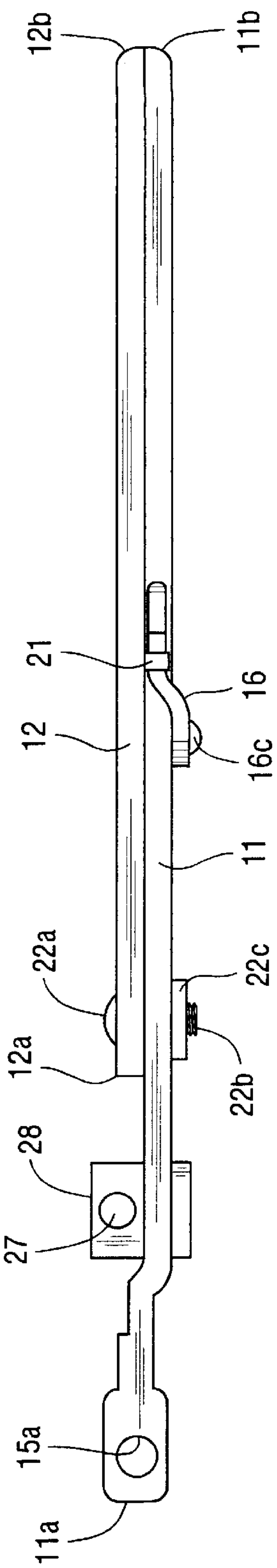
FIG. 2 is a top view of the impeller puller of FIG. 1 with extraction bolt removed.
Figure 3:
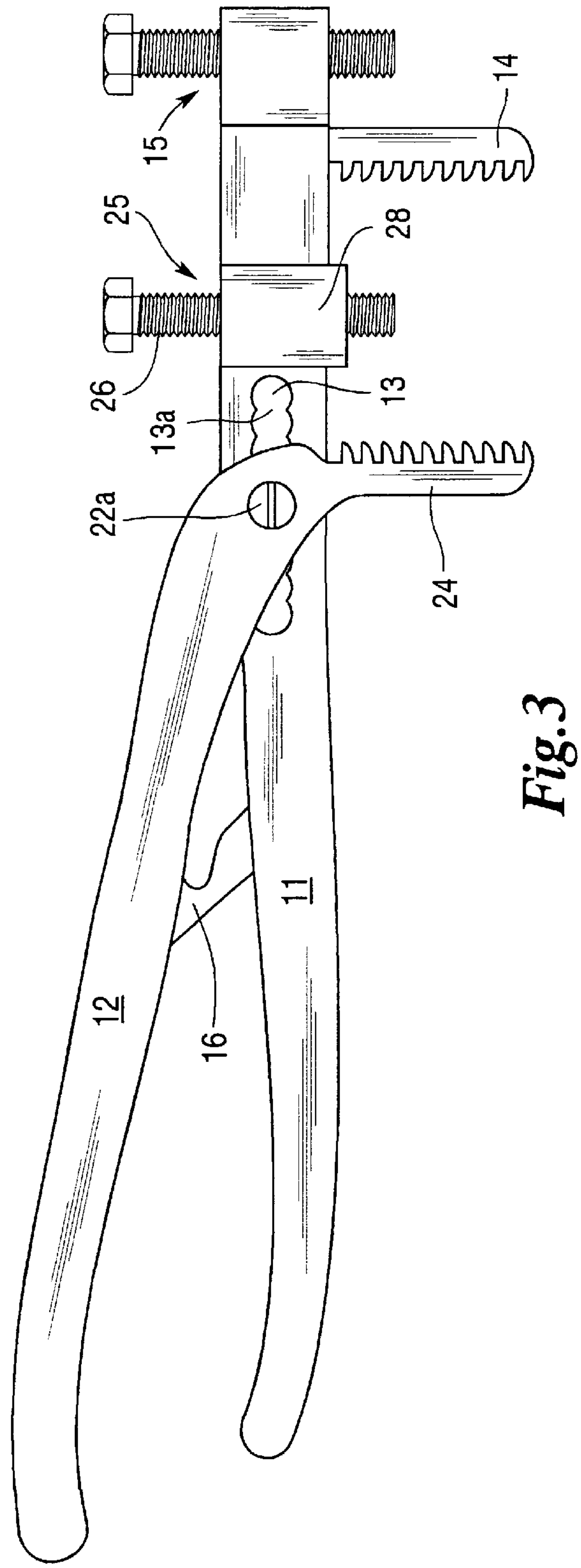
FIG. 3 is a reverse side plan view of the puller of FIG. 1.
Figure 3A:
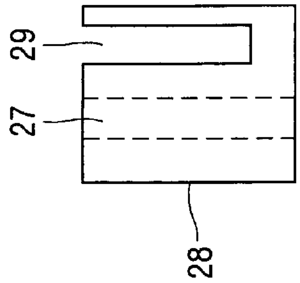
FIG. 3A is an end view of the center extraction block of FIG. 1.

In operation of the pivot plier puller of FIGS. 1–3, second elongate member 12 is moved from hole to hole as desired to position second gripping jaw 24 along the support member in a desired spaced relationship to the first gripping jaw 14. The extended length of the elongate members 11 and 12 comprising handle portions 11*c* and 12*c*, are hand compressed toward each other causing second jaw member 24 to pivot at the coupled position of stud 22 and grip the hub of the impeller between the jaws. The sizing and arrangement of the holes provide various generally parallel opposing alignment of the opposing jaws on standard hub diameters and latch slots 16*c* are positioned to engage latch stud 21 and lock the plier arrangement at a significant gripping force on standard impeller hub diameters. The extraction screw is twist screw adjusted to point engage the housing and the user pivots the pliers on the point engagement, rocking the impeller hub from the impeller shaft.

It should be understood that though specific fixed extractor means is illustrated in FIGS. 1–3, the invention also contemplates extractor means being slidably mounted along said support member from the about the first end to about the first gripping jaw, extractor means slidably mounted between the jaws, and any combination of fixed or slidable extractor means arranged at both positions along elongate element 11. Similarly, though specific latch means is illustrated in FIGS. 1–3, any convenient means to maintain the elongate members in locked relative position is contemplated within the invention.

Figure 4:
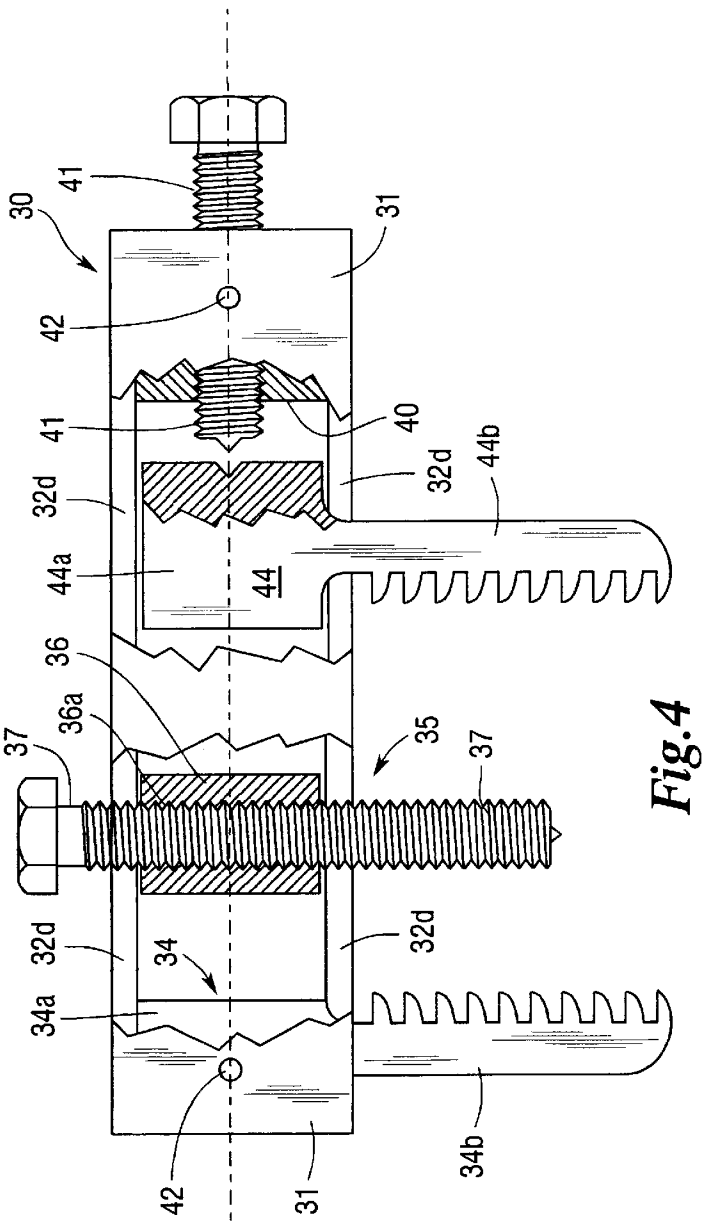
FIG. 4 is a partially sectioned side view of a screw urged impeller puller embodiment of the invention.
Figure 5:
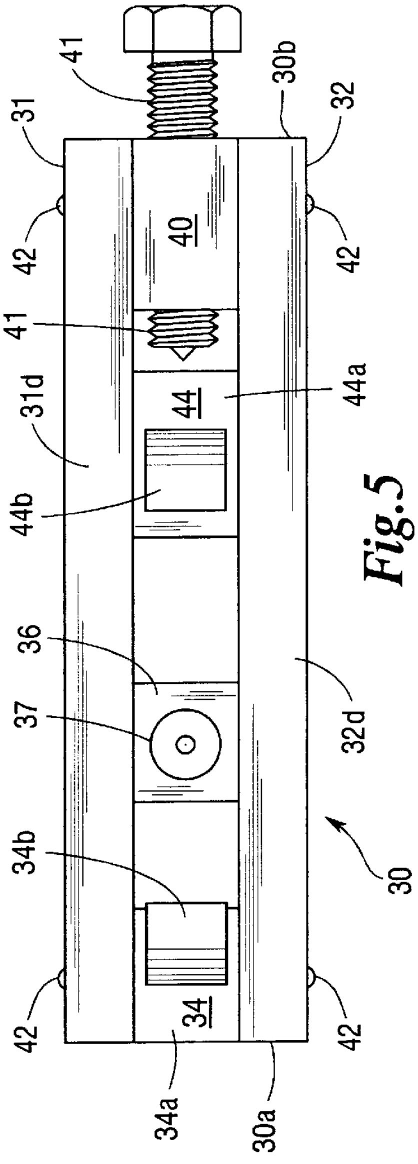
FIG. 5 is a bottom view of the impeller puller of FIG. 4.
Figure 6:
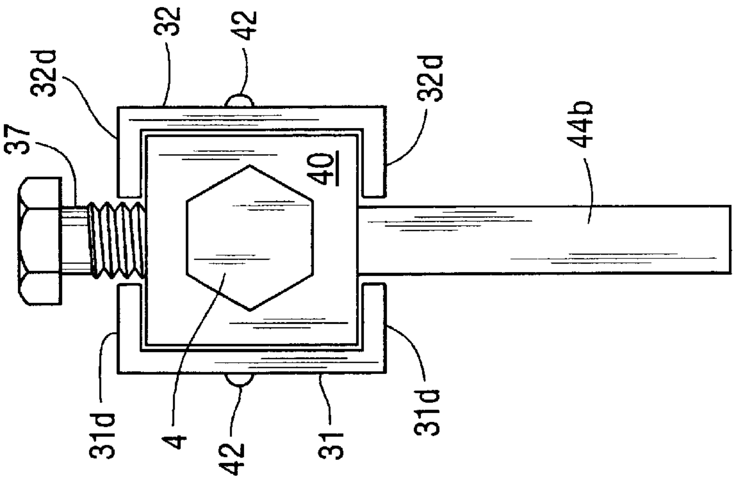
FIG. 6 is an end view of the puller of FIG. 4.

Referring now to the FIGS. 4–6, wherein is illustrated a polygonal tube type, twist screw urged impeller puller of the invention wherein the support member 30 comprises an assembly of first and second, spaced apart, elongate "U" channel members 31 and 32, with legs 31*d* and 32*d* respectively connected in generally parallel facing opposition by polygonal base 34*a* of first gripping jaw 34 at first end 30*a* and connected by polygonal configured spacer urging block 40 at opposite end 30*b*, effectively forming a four walled elongate polygonal support member having an interior polygonal hollow with aligned, longitudinally opposing, slotted openings thereto.

First gripping jaw 34 is illustrated as comprising a narrow elongate toothed jaw 34*b* extending from base end 34*a*, being sized to fit between legs 31*d* and 32*d* of facing channel members 31 and 32 respectively. Urging block 40 is dimensionally sized similar to first gripping jaw base 34*a* to retain the channel members about parallel spaced, and comprises a threaded hole 40*a* therethrough, generally arranged along about a central axis of the constructed support member for threaded insertion of a mating twist threaded urging screw member 41. Though facing channels are pinned 42 to base end 34*a* and urging block 40, it is contemplated they may be screwed, welded or the like connected thereto.

Second jaw member 44 is illustrated as comprising a narrowed elongate toothed jaw 44*b* extending from base end 44*a*, with polygonal base end 44*a* dimensioned slightly smaller than the polygonal configured base end 34*a* of first jaw member 34 and toothed jaw 44*b* being sized the same or similar to toothed jaw 34*b* of first jaw member 34, so as to fit between legs 31*d* and 32*d* of facing channel members 31 and 32 respectively. The slightly smaller dimensioning of base end 44*a* of second jaw member 44 enables it to be slidably moved axially within the hollow of the support member, with narrowed elongate toothed jaw 44*b* extending through the slot in general alignment with elongate toothed jaw 34*b* of first jaw member 34.

Arranged along support member 30, between the base end 34*a* of first jaw member 34 and base 44*a* of second jaw member 44, is extraction screw means 35, comprising polygonal extraction block 36, having a threaded hole 36*a* arranged about perpendicular to a longitudinal axis of the support member and threaded extraction bolt member 37. As with base 44*a* of second jaw member 44, extraction block 36 is sized and dimensioned slightly smaller than polygonal configured spacer urging block 40 and base end 34*a* of first jaw member 34 so as to slidably move axially within the hollow of support member 30. Threaded hole 36*a* is dimensioned such that mating twist threaded extraction bolt member 37 can be threaded through the block without interfering with sides 31*d* and 32*d* respectively of the aligned elongate slotted openings formed by channel members 31 and 32 comprising support member 30.

Figure 7:
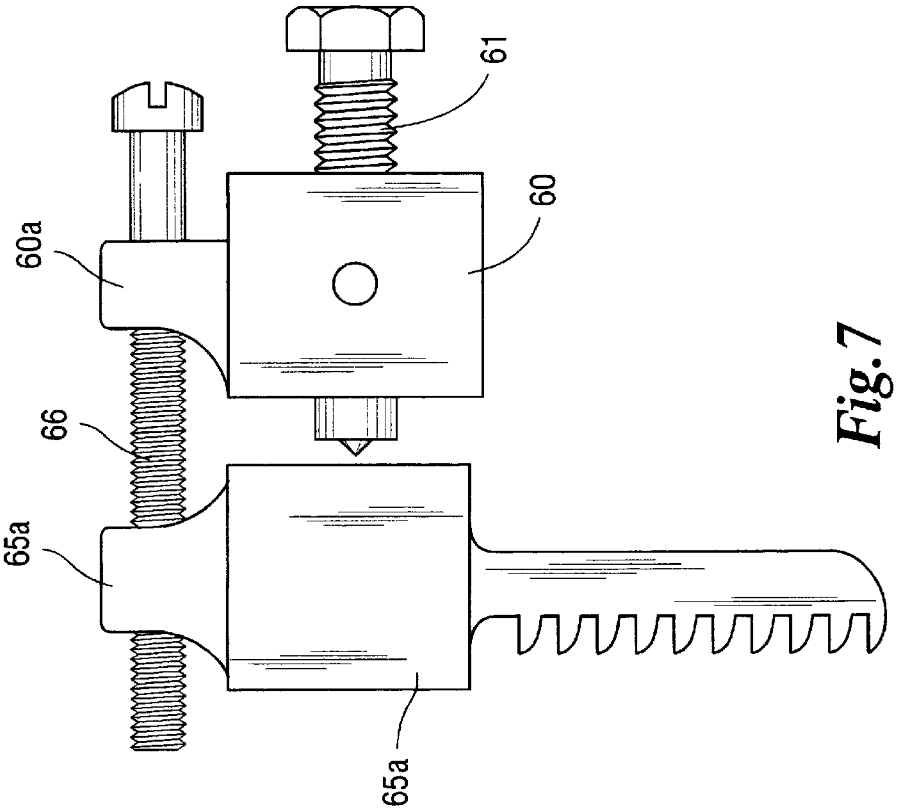
FIG. 7 is a side plan view of a preferred combination of second jaw member and urging block arrangement of the invention.

FIG. 7, depicts a preferred linked combination of urging block and second jaw member of the invention particularly useful in the embodiment of FIGS. 4–6. Therein, both urging block 60, comprising urging screw 61, and second jaw member base 65*a* comprise nodules 60*a* and 65*b* respectively, which extend therefrom through the slot formed by the facing channel members. Nodule 65*b* comprises a hole therethrough threaded to accept mating threaded bolt 66. Nodule 60*a* comprises an unthreaded hole through which bolt 66 can pass through. It has been found that in some circumstances of use second jaw member base 65*a* can become angularly jammed in the tubular support member hollow and it can become difficult to move the jaw away from its compressed engagement with an impeller. Tightening of bolt 66 reverses the angle of the base member and tends to release base 65*a* from the jam.

Figure 10:
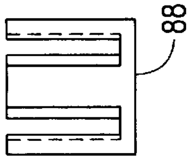
FIG. 10 is an end plan view of the extraction block of FIG. 8.
Figure 9:
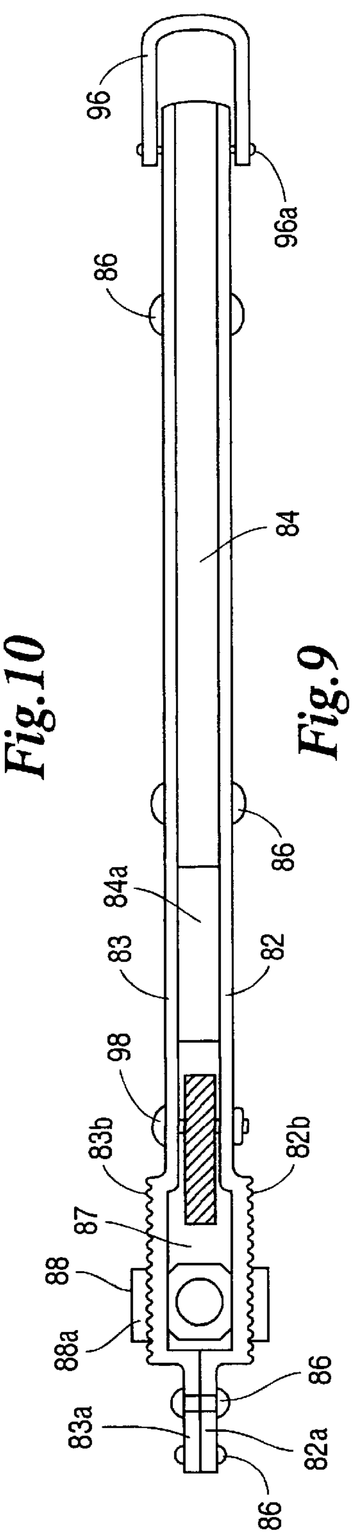
FIG. 9 is a partial sectional, top plan view of the impeller puller of FIG. 8, taken along about line 9–9'.
Figure 8:
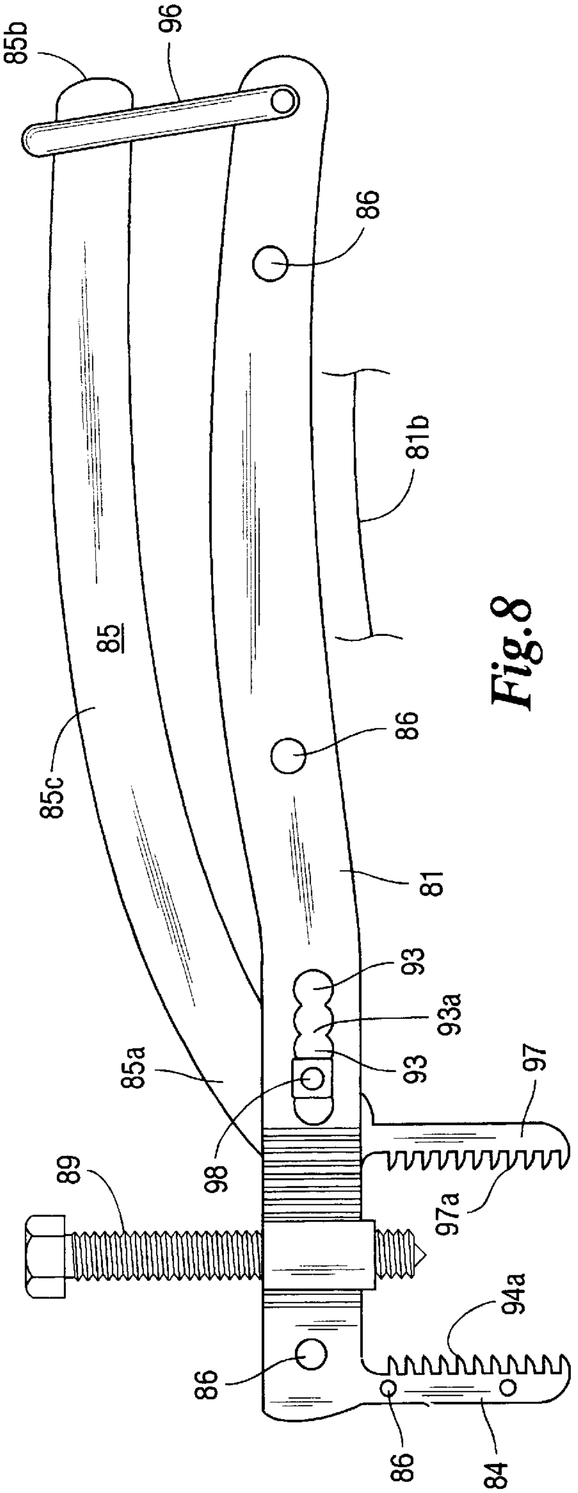
FIG. 8 is a side plan view of an alternate pivot plier impeller puller embodiment of the invention.

Referring now to the FIGS. 8–10, therein is illustrated a further embodiment of a pivot plier impeller puller of the invention, wherein the support member comprises first and second elongate pivot members 81 and 85 respectively.

Elongate member 81 is depicted as comprising elongate plates 82 and 83 spaced apart by elongate plate 84. The plates are connected by rivets 86, and the end portion of plates 82 and 83 are configured to form slot 87 with ends 82*a* and 83*a* merging to form first gripping jaw 94. Slot 87 is configured to accept extraction block 88 which in turn is threaded to accept extraction bolt means 89. Member 81 comprises a plurality of about equal diameter aligned holes 93, which overlap at their circumference so as to create openings 93*a* therebetween and latch member 96 which is pivotally attached along member 81 by rivet stud 96*a*.

First gripping jaw 94 is illustrated as formed by merged ends 82*a* and 83*a* of plates 82 and 83, and is arranged to extend about perpendicular from plates 82 and 83 and have a plurality of teeth 94*a* arranged along the length thereof. Handle portion 81*b* of elongate member 81, is illustrated in this particular embodiment as being slightly curved to enable easier gripping by a user. Plates 82 and 83 are illustrated as comprising extraction ridges 82*b* and 83*b* respectively, arranged to matingly engage slots 88*a* in extraction block 88. Elongate Plate 84 is angled at end 84*a*.

Second elongate member 85 is illustrated as comprising first end 85*a*, opposite end 85*b*, handle portion 85*c* and second gripping jaw 97. Second gripping jaw 97 is illustrated as integral to first end 85*a* of elongate member 85, arranged to extend angularly from about the centerline of the second member and having a plurality of teeth 97*a* arranged along the length thereof. Handle portion 85*c* of elongate member 85, is also illustrated as being slightly curved to enable easier gripping by a user. Attachment bolt 98 is sized in diameter to enable slidable passage through openings 93*a* between holes 93 of elongate member 81, and through a hole (not shown) in member 85 arranged at about the top of the second gripping jaw. Thus in the illustrated embodiment, elongate member 85 is slidably and pivotally connected between plates 82 and 83 of elongate member 81 by attachment bolt 98.

In operation, the second jaw member is moved toward and away from the first jaw member by movement of the pivot attachment bolt laterally among the plurality of holes 93 in member 81, to enable the jaws to engage variable sized hubs, while extraction block is moved to various positions between the first and second jaw members by resetting the extraction block at different mating ridge alignments along plates 82 and 83 of elongate member 81.

Further embodiments of the invention should be apparent from the following recitation of the claims.

I claim:

1. An adjustable puller comprising:

an elongate support member having a longitudinal axis, a first end and opposite end;

a first elongate jaw member, fixedly attached proximate said first end and configured to extend radially outwardly from about said longitudinal axis of said support member, said jaw member comprising a gripping surface arranged to generally face said opposite end;

a second elongate jaw member, movably mounted along said support member spaced from said first jaw member toward said opposite end, said second jaw member configured to extend radially outwardly from about said longitudinal axis of said support member in general alignment with said first jaw member and comprising a gripping face arranged to generally face said gripping surface of said first jaw member;

an elongate, twist threaded, extraction screw member, mounted to said support member and arranged to be incrementally screwed radially outwardly therefrom in general radial alignment with said first and second jaw members, said extraction screw member being axially moveable along about said longitudinal axis of said support member.

2. A puller of claim 1 wherein said first jaw member is arranged spaced proximate said first end of said support member, and said extraction screw member is slidably mounted along said support member between said first jaw member and said first end.

3. A puller of claim 1 wherein said first jaw member is arranged near proximate said first end of said support member, and said extraction screw member is slidably mounted along the support member between said first jaw member and said second jaw member.

4. A puller of claim 1 wherein said first jaw member is fixedly connected to said support member.

5. A puller of claim 1 wherein said elongate support member comprises first and second elongate pivot members, said first elongate pivot member comprises said first jaw member and has a plurality of adjacent about equal diameter holes, arranged progressively spaced from said first jaw member, said second elongate pivot member comprises said second jaw member at a first end thereof and has spaced from said first end a stud extending about perpendicular to said second jaw member, said stud is sized to matingly insert through said plurality of holes in said first elongate pivot member and comprises means at the end thereof to pivotally connect said stud to said first elongate pivot member.

6. A puller of claim 5 wherein said plurality of about equal diameter holes are arranged in circumferential serial overlapping alignment, said overlapping alignment forms openings between said holes, and said openings are sized to enable passage of said stud from hole to serially adjacent hole.

7. A puller of claim 6 wherein said extraction screw member, is mounted to said first elongate pivot member between said first jaw member and said plurality of holes.

8. A puller of claim 6 wherein said first jaw member is arranged spaced proximate said first end of said first elongate pivot member, and said extraction screw member is arranged on said first elongate pivot member between said first jaw member and said first end of said first elongate pivot member.

9. A puller of claim 1 wherein said support member comprises first and second elongate pivot members, said first elongate pivot member comprises said first jaw member and has a plurality of adjacent about equal diameter holes arranged progressively spaced from said first jaw member, said second elongate pivot member comprises said second jaw member at a first end thereof, and pivotal connecting means are arranged among said equal diameter holes of said first elongate pivot member and said second elongate pivot member, connecting said first elongate pivot member to said second elongate pivot member at a point along said second elongate pivot member spaced from said first end thereof.

10. A puller of claim 9 wherein said pivotal connecting means comprises bolt means arranged to extend through an opening in said second elongate pivot member about perpendicular to said second jaw member, said bolt means being sized to matingly insert through said plurality of holes in said first elongate pivot member.

11. A puller of claim 10 wherein said plurality of about equal diameter holes are arranged in circumferential serial overlapping alignment, said overlapping alignment forms openings between said holes, and said openings are sized to enable passage of said bolt means from hole to serially adjacent hole.

12. A puller of claim 10 wherein said extraction screw member, is mounted to said first elongate pivot member between said first jaw member and said plurality of holes.

13. A puller of claim 9 wherein said first jaw member is arranged spaced proximate said first end of said first elongate pivot member, and said extraction screw member is arranged on said first elongate pivot member between said first jaw member and said first end of said first elongate pivot member.

14. A puller of claim 1 comprising twist screw urging arranged to engage said second jaw member and urge said second jaw member along said support member toward said first jaw member.

15. A puller of claim 1 wherein said support member comprises an elongate hollow tubular member having two opposing, longitudinally extending, slotted openings to the hollow interior thereof; said first and second jaw members comprise an enlarged base and a narrow elongate toothed jaw, said base end having a cross-sectional shape generally conforming to the cross-sectional shape of said hollow interior and said narrow elongate jaw being shaped to enable passage through said slotted openings; a twist urging screw means arranged proximate said opposite end of said support member and enabled to engage the enlarged base of said second jaw member and urge said second jaw member toward said first jaw member.

16. A puller of claim 15 wherein said twist urging screw means comprises a spacer block having a twist threaded hole arranged along about said longitudinal axis and a mating elongate twist threaded screw.

17. A puller of claim 15 wherein said extraction screw member, is mounted to said hollow member between said first jaw member and said second jaw member.

18. A puller of claim 15 wherein said first jaw member is arranged spaced proximate said first end of said first elongate member, and said extraction screw member is arranged on said first elongate member between said first jaw member and said first end of said first elongate member.

* * * * *